United States Patent
Joglekar et al.

(10) Patent No.: US 10,162,826 B2
(45) Date of Patent: Dec. 25, 2018

(54) UOA MIGRATION

(71) Applicant: Oracle International Corporation, Redwood Shores, CA (US)

(72) Inventors: Maura Joglekar, Milpitas, CA (US); Hui Ye, Shakopee, MN (US); Todd Price, Chanhassen, MN (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 230 days.

(21) Appl. No.: 14/447,867

(22) Filed: Jul. 31, 2014

(65) Prior Publication Data
US 2015/0120672 A1    Apr. 30, 2015

Related U.S. Application Data

(60) Provisional application No. 61/897,998, filed on Oct. 31, 2013.

(51) Int. Cl.
*G06F 17/30* (2006.01)
*G06F 3/06* (2006.01)
*G06F 11/14* (2006.01)

(52) U.S. Cl.
CPC ........ *G06F 17/30073* (2013.01); *G06F 3/065* (2013.01); *G06F 3/0647* (2013.01); *G06F 17/303* (2013.01); *G06F 17/30079* (2013.01); *G06F 3/067* (2013.01); *G06F 11/1446* (2013.01); *G06F 11/1464* (2013.01); *G06F 17/30221* (2013.01); *G06F 17/30575* (2013.01); *G06F 17/30584* (2013.01)

(58) Field of Classification Search
None
See application file for complete search history.

(56) References Cited

U.S. PATENT DOCUMENTS

| | | | | |
|---|---|---|---|---|
| 2005/0044097 A1* | 2/2005 | Singson | ................ | G06Q 10/10 707/999.102 |
| 2011/0282835 A1* | 11/2011 | Cannon | ............. | G06F 17/30079 707/622 |
| 2012/0030247 A1* | 2/2012 | Yambal | ............. | G06F 17/30079 707/802 |

OTHER PUBLICATIONS

Oracle® Fusion Middleware Developers Guide for Content Server 11g Release 1 (Jan. 1, 2011), "3.2 About Directories and Files," May 29, 2012, retrieved Mar. 26, 2018 from Internet Archive Wayback Machine at https://web.archive.org/web/20120529010701/https://docs.oracle.com/cd/E21043_01/doc.1111/e10807/c03_components002.htm.*

* cited by examiner

*Primary Examiner* — Mariela Reyes
*Assistant Examiner* — Edward Jacobs
(74) *Attorney, Agent, or Firm* — Kilpatrick Townsend & Stockton LLP

(57) ABSTRACT

Systems and methods are disclosed for a migration tool that rapidly transfers metadata between a source content archive and a target content archive. In one aspect, the rapid transfer is facilitated by customizable multithreading that includes the ability to suspend and/or resume migration. In a further aspect, migration between the source content archive and the target content archive is facilitated by allowing at least metadata associated with content stored in the source archive to be transferred between the systems. An external data storage component is provided that allows applications to access the target system using the migrated metadata while also providing access to associated content stored in other locations. Therefore, the actual content in the original source archive may be eventually migrated to the target system while applications are provided seamless access.

19 Claims, 7 Drawing Sheets

FIG. 4

JOB EXECUTION

You can process all documents or limit migration to a number or range. Additional query terms specifying odmv_document columns can be used to filter the results of any of the options.

○ Process all documents
● Limit migration to a specific number of documents
○ Limit migration to a range of document IDs Number of documents: 10000

Additional query terms:

[START] [SUSPEND] [STOP]

**\* Migration in Progress**

Time of Report: 2/1/12 10:33 AM
Elapsed Migration Time: 17 secs 324 ms

Initial number of documents in Content Server: 0
Documents in Content Server after migration: 8706
Performance Rate (Document/Second): 512

Migration Results

| | |
|---|---|
| Distinct Documents Migrated: | 8706 |
| Document Revisions Migrated: | 9 |
| UOA Pending/Working Copies – NOT Migrated: | 4 |
| Not a Real Document – NOT Migrated: | 1 |
| TOTAL (SUM OF ABOVE): | 8720 |
| TOTAL REQUESTED: | 10000 |

FIG. 6

UOA MIGRATION

CROSS-REFERENCE TO RELATED APPLICATIONS

This Applications claims the benefit of and priority to U.S. Provisional Application No. 61/897,998, filed Oct. 31, 2013 and entitled "UOA Migration," the disclosure of which is incorporated by reference herein for all purposes.

BACKGROUND OF THE INVENTION

In the past few years, major changes have been taking place in the content management marketplace. Customers who previously considered content management to be a niche application focused on workgroup or departmental deployments for meeting specialized publishing-oriented requirements are increasingly requesting true enterprise deployments designed to get all of their unstructured information under better control. One consequence of this new, expanded view of content management is the convergence of archiving technology with Enterprise Content Management. Another, more significant consequence is a dramatic shift in the very nature of archiving functionality in this expanded content management view.

One dictionary of the English Language defines "archive" in the context of electronic technology as "A long-term storage area, often on magnetic tape, for backup copies of files or for files that are no longer in active use." However, issues of regulatory compliance, corporate governance, electronic discovery, and intellectual property protection have significantly expanded the requirements to manage content—whether in "active use" or not. Further, the notion that certain kinds of content should be moved to less accessible media such as magnetic tape is also being called into question as online media prices plummet and the risks and costs associated with tape archiving and backup become more fully understood. Finally, as the focus of archiving shifts from a few especially important documents to the majority of all enterprise information, the complexities and expense of deploying separate, large-scale archives for email, business documents, images, rich media, ERP transactions, etc. are driving customers to look at more general, type-agnostic archiving solutions.

These changes have created an opportunities for developers to provide new classes of content management solutions. One product, provided by Oracle of Redwood Shores, Calif., called Universal Online Archiving works like other traditional electronic archives, focusing on managing enormous quantities of historical information, such as that which has reached the point in its lifecycle where content is no longer changing. The solution is called universal in that it manages all different types of static information in a single environment.

One problem with any archive having enormous quantities of historical information is that much of the managed information needs to be maintained so it is readily accessible to business, imaging, compliance, e-discovery, and business continuity applications. While the information content does not change over time, the lifecycle of the information actively continues under a centralized policy manager that controls retention, security, storage management, and even movement of content into and out of the archive.

Accordingly, what is desired is to solve problems relating to the rapid migration of metadata between content storage archives, some of which may be discussed herein. Additionally, what is desired is to reduce drawbacks relating to the rapid migration of metadata between content storage archives, some of which may be discussed herein.

BRIEF SUMMARY OF THE INVENTION

The following portion of this disclosure presents a simplified summary of one or more innovations, embodiments, and/or examples found within this disclosure for at least the purpose of providing a basic understanding of the subject matter. This summary does not attempt to provide an extensive overview of any particular embodiment or example. Additionally, this summary is not intended to identify key/critical elements of an embodiment or example or to delineate the scope of the subject matter of this disclosure. Accordingly, one purpose of this summary may be to present some innovations, embodiments, and/or examples found within this disclosure in a simplified form as a prelude to a more detailed description presented later.

Systems and methods are disclosed for a migration tool that rapidly transfers metadata between a source content archive and a target content archive. In one aspect, the rapid transfer is facilitated by customizable multithreading that includes the ability to suspend and/or resume migration. In a further aspect, migration between the source content archive and the target content archive is facilitated by allowing at least metadata associated with content stored in the source archive to be transferred between the systems. An external data storage component is provided that allows applications to access the target system using the migrated metadata while also providing access to associated content stored in other locations. Therefore, the actual content in the original source archive may be eventually migrated to the target system while applications are provided seamless access.

A further understanding of the nature of and equivalents to the subject matter of this disclosure (as well as any inherent or express advantages and improvements provided) should be realized in addition to the above section by reference to the remaining portions of this disclosure, any accompanying drawings, and the claims.

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of any of the claimed inventions, any of the presently described embodiments and/or examples, or the presently understood best mode of any innovations presented within this disclosure.

FIG. 4 is a screenshot of a user interface configured to allow users to customize metadata mappings for a metadata migration in one embodiment according to the present invention.

FIG. 6 is a screenshot of a user interface configured to allow users to view and interact with progress of a metadata migration in one embodiment according to the present invention.

DETAILED DESCRIPTION OF THE INVENTION

Introduction

Figure 1:
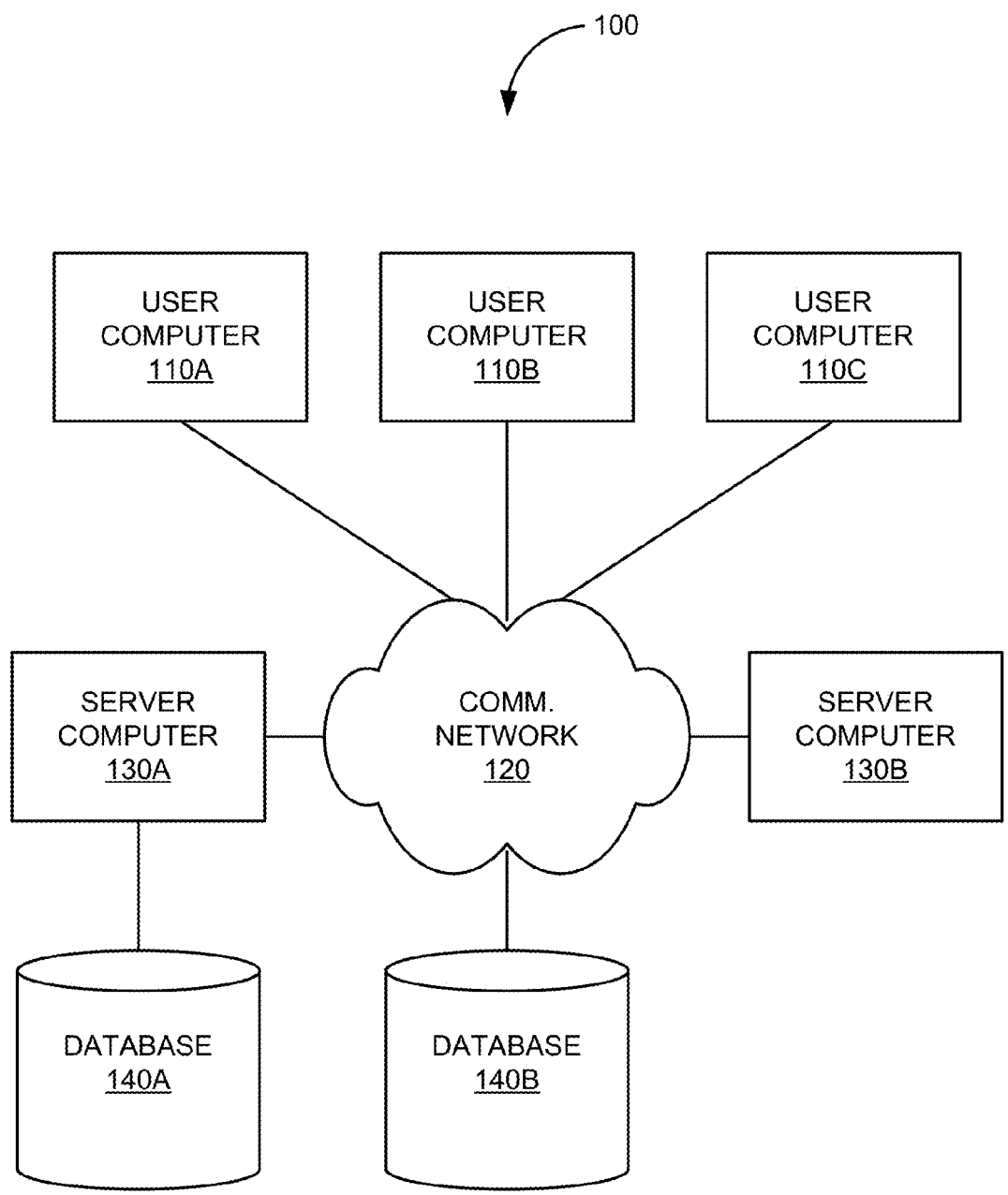
FIG. 1 is a simplified illustration of a system that may incorporate an embodiment of the present invention.

FIG. 1 is a simplified illustration of system 100 that may incorporate an embodiment or be incorporated into an embodiment of any of the innovations, embodiments, and/or examples found within this disclosure. FIG. 100 is merely illustrative of an embodiment incorporating the present invention and does not limit the scope of the invention as recited in the claims. One of ordinary skill in the art would recognize other variations, modifications, and alternatives.

In one embodiment, system 100 includes one or more user computers 110 (e.g., computers 110A, 110B, and 110C). User computers 110 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 110 can also have any of a variety of applications, including one or more applications configured to perform methods of the invention, as well as one or more office applications, database client and/or server applications, and web browser applications.

Alternatively, user computers 110 can be any other electronic device, such as a thin-client computer, Internet-enabled mobile telephone, and/or personal digital assistant, capable of communicating via a network (e.g., communications network 120 described below) and/or displaying and navigating web pages or other types of electronic documents. Although the exemplary system 100 is shown with three user computers, any number of user computers or devices can be supported.

Certain embodiments of the invention operate in a networked environment, which can include communications network 120. Communications network 120 can be any type of network familiar to those skilled in the art that can support data communications using any of a variety of commercially-available protocols, including without limitation TCP/IP, SNA, IPX, AppleTalk, and the like. Merely by way of example, communications network 120 can be a local area network ("LAN"), including without limitation an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 130 (e.g., computers 130A and 130B). Each of server computers 130 may be configured with an operating system including without limitation any of those discussed above, as well as any commercially-available server operating systems. Each of server computers 130 may also be running one or more applications, which can be configured to provide services to one or more clients (e.g., user computers 110) and/or other servers (e.g., server computers 130).

Merely by way of example, one of server computers 130 may be a web server, which can be used, merely by way of example, to process requests for web pages or other electronic documents from user computers 110. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 110 to perform methods of the invention.

Server computers 130, in some embodiments, might include one ore more file and or/application servers, which can include one or more applications accessible by a client running on one or more of user computers 110 and/or other server computers 130. Merely by way of example, one or more of server computers 130 can be one or more general purpose computers capable of executing programs or scripts in response to user computers 110 and/or other server computers 130, including without limitation web applications (which might, in some cases, be configured to perform methods of the invention).

Merely by way of example, a web application can be implemented as one or more scripts or programs written in any programming language, such as Java, C, or C++, and/or any scripting language, such as Perl, Python, or TCL, as well as combinations of any programming/scripting languages. The application server(s) can also include database servers, including without limitation those commercially available from Oracle, Microsoft, IBM and the like, which can process requests from database clients running on one of user computers 110 and/or another of server computers 130.

In some embodiments, an application server can create web pages dynamically for displaying the information in accordance with embodiments of the invention. Data provided by an application server may be formatted as web pages (comprising HTML, XML, Javascript, AJAX, etc., for example) and/or may be forwarded to one of user computers 110 via a web server (as described above, for example). Similarly, a web server might receive web page requests and/or input data from one of user computers 110 and/or forward the web page requests and/or input data to an application server.

In accordance with further embodiments, one or more of server computers 130 can function as a file server and/or can include one or more of the files necessary to implement methods of the invention incorporated by an application running on one of user computers 110 and/or another of server computers 130. Alternatively, as those skilled in the art will appreciate, a file server can include all necessary files, allowing such an application to be invoked remotely by one or more of user computers 110 and/or server computers 130. It should be noted that the functions described with respect to various servers herein (e.g., application server, database server, web server, file server, etc.) can be performed by a single server and/or a plurality of specialized servers, depending on implementation-specific needs and parameters.

In certain embodiments, system 100 can include one or more databases 140 (e.g., databases 140A and 140B). The location of the database(s) 140 is discretionary: merely by way of example, database 140A might reside on a storage medium local to (and/or resident in) server computer 130A (and/or one or more of user computers 110). Alternatively, database 140B can be remote from any or all of user computers 110 and server computers 130, so long as it can be in communication (e.g., via communications network 120) with one or more of these. In a particular set of embodiments, databases 140 can reside in a storage-area network ("SAN") familiar to those skilled in the art. (Likewise, any necessary files for performing the functions attributed to user computers 110 and server computers 130 can be stored locally on the respective computer and/or remotely, as appropriate). In one set of embodiments, one or more of databases 140 can be a relational database that is adapted to store, update, and retrieve data in response to SQL-formatted commands. Databases 140 might be controlled and/or maintained by a database server, as described above, for example.

Migration System

Systems and methods are disclosed for a migration tool that rapidly transfers metadata between a source content archive and a target content archive. In one aspect, the rapid transfer is facilitated by customizable multithreading that includes the ability to suspend and/or resume migration. In a further aspect, migration between the source content archive and the target content archive is facilitated by allowing at least metadata associated with content stored in the source archive to be transferred between the systems. An external data storage component is provided that allows applications to access the target system using the migrated metadata while also providing access to associated content stored in other locations. Therefore, the actual content in the original source archive may be eventually migrated to the target system while applications are provided seamless access.

For the purposes of this disclose, content refers to any information stored as a single entity or as a collection of entities. Content may include documents, images, multimedia information and the like. Metadata refers to information that describes or is otherwise associated with content. Metadata may be classified into regular metadata being that that is well known or structured to an application and additional metadata being that that is custom or user-defined. In some embodiments, additional metadata referred to herein comprises categories of metadata or other entity attributes that have been defined in addition to regular metadata. In further embodiments, metadata may refer to hierarchical information associated with content, folder structures, or other logical organizations.

Figure 2:
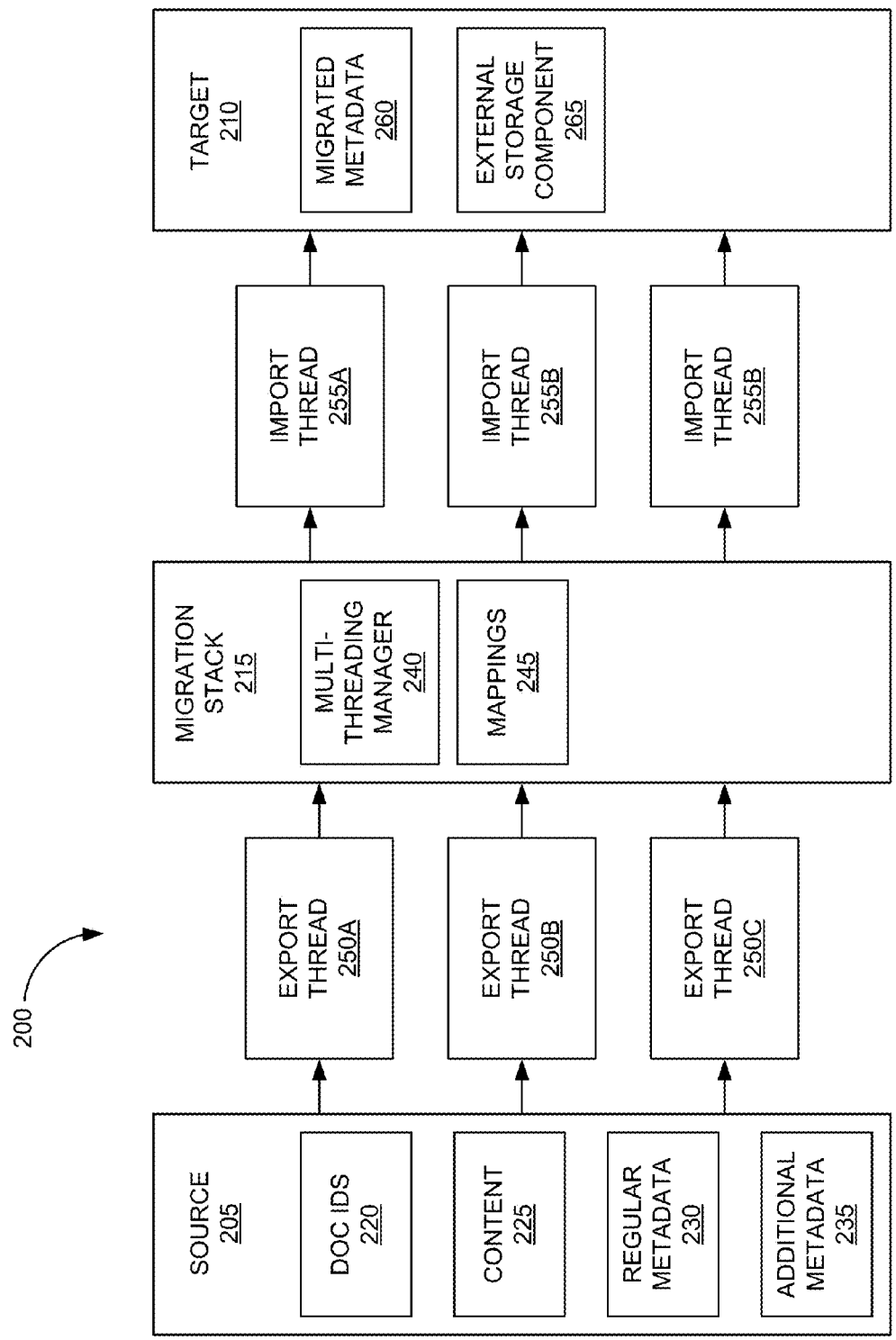
FIG. 2 is a block diagram of a migration system according to one embodiment of the present invention.

FIG. 2 is a block diagram of migration system 200 according to one embodiment of the present invention. In this example, migration system 200 involves the migration of metadata between source archive 205 and target archive 210 using migration stack 215. In order to provide rapid migration of metadata between source archive 205 and target archive 210, migration system 200 provides customizable multithreading that includes the ability to suspend and/or resume migration. In another aspect, migration system 200 initiates a self-discovery of additional metadata that should be migrated between systems and the customization of metadata mappings for the additional metadata. In a further aspect, migration system 200 accelerates migrations between archives using an external data storage component. Thus, just the metadata is transferred between archives while providing applications to access the target to retrieve content from the original source archive using a set of rules that define how to access the content.

Referring again to FIG. 2, source archive 205 is representative of one or more content archives. Source archive 205 may include hardware and/or software elements configured to store and retrieve data. Source archive 205 may employ one or more known techniques for storing and accessing data, such as relational databases, Big Data, and the like. In general, source archive 205 provides a set of document identifiers 220. Each document identifier provides reference to an individual unit of content. Content 225 may include any type or form of data. Regular metadata 230 includes information describing or associated with content 225. Regular metadata 230 may include document identifiers 220. Additional metadata 235 also includes information describing or associated with content 225.

A metadata migration typically involves the transfer of metadata in a source archive to a target archive. In some embodiments, migration system 200 implements a multi-threaded approach to metadata migration using migration stack 215. Migration stack 215 includes hardware and/or software elements configured to migrate metadata between source archive 205 and target archive 210. In this example, migration stack 215 includes multithreading manager 240 and mappings 245. Migration system 200 allows users to specify the number of "worker" threads for each of a plurality of migration functions. In one aspect, based on resources available and their requirements, users may specify a number of export threads 250 (e.g., export threads 250A-C) and import threads 255 (e.g., export threads 255A-C). Threads may be started, stopped, paused, and resumed, and operations may be applied to one or more threads.

In another aspect, mappings 245 includes one or more mappings used for identifying how one piece of metadata in source archive 205 is transferred to target archive 210. As discussed above, many times the metadata is well formed and its structure is known. Regular metadata 230 is representative of this type of metadata. Because the format, structure/schema, or location of regular metadata is well understood, migration system 200 may automatically provide for the needed mappings between source archive 205 and target archive 210 allowing regular metadata 230 to be mapped for migration without further user review or interaction.

In some embodiments, migration system 200 provides for an automatic discovery or self-discovery of additional metadata 235. Migration system 200 may recognize that some metadata in source archive 205 has no known placeholder in target archive 210. Migration system 200 may provide one or more user interfaces configured to allow users to specify or define mappings for regular metadata 230 and additional metadata 235 automatically discovered by migration system 200. In one example, a user is able to upload custom mappings for additional metadata 235 to migration system 200 and have the custom mappings added to mappings for regular metadata 230. Migration system 200 then utilizes mappings 245 to implement how metadata in source archive 205 is transferred to target archive 210.

Migration system 200 may take different approaches to get metadata. In one example, migration system 200 may use one or more application programming interfaces (APIs). However, it may be preferable in terms of speed and efficiency for migration system 200 to directly query tables of source archive 205 for the metadata. In one aspect, a user can specify which approach to use by setting a parameter in migration stack 215. There can be advantages and disadvantages to both, using the API is easier to read and more user friendly. In contrast, using the system tables directly generally provides a faster migration than using the API.

Target archive 210 is representative of one or more content archives. Target archive 210 may include hardware and/or software elements configured to store and retrieve data. Target archive 210 may also employ one or more known techniques for storing and accessing data, such as relational databases, Big Data, and the like. In general, target archive 210 provides a repository for migrated metadata 260. Migrated metadata 260 may include documents identifiers 220 as well as a subset of regular metadata 230 and a subset of additional metadata 235. Migrated metadata 260 may include other metadata or enriched data obtained during a migration process.

As discussed above, migration system 200 may accelerate the time at which target archive 210 becomes usable to other applications desiring access to content 225 using external storage component 265. External storage component 265 provides a set of rules that define how to access content 225. For example, if content 225 remains stored in source archive 205, external storage component 265 may retrieve content 225 from source archive 205 and provide it directly or indirectly to a requesting application. Alternatively, external storage component 265 may configure a requesting application to directly retrieve content 225 from its current location. Accordingly, metadata may be migrated more rapidly to target archive 210 than a migration of content 225 would allow. External storage component 265 allows content 225 to be migrated separately while providing concurrent access to applications retrieving metadata from target archive 210 and content from source archive 205.

Figure 3:
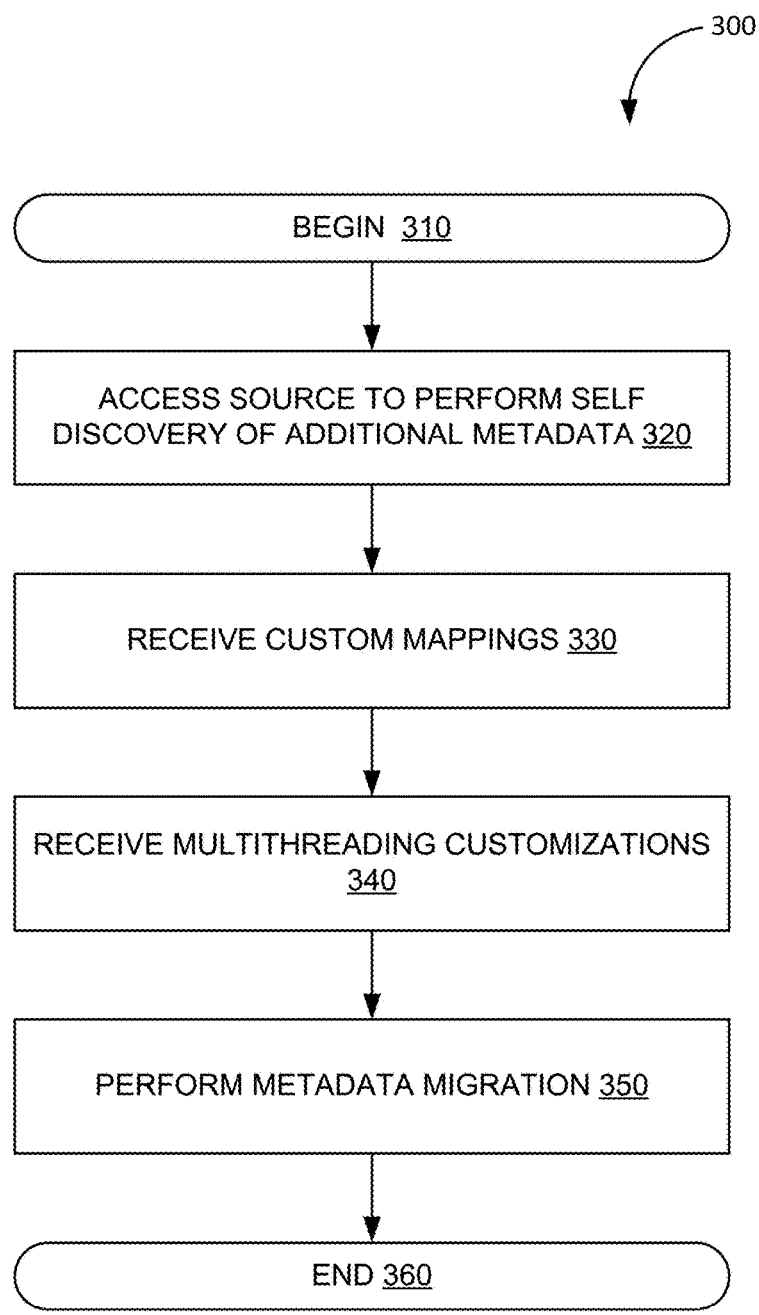
FIG. 3 is a flowchart of a method for rapid metadata migration according to one embodiment of the present invention.

FIG. 3 is a flowchart of method 300 for rapid metadata migration according to one embodiment of the present invention. Implementations of or processing in method 300 depicted in FIG. 3 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 300 depicted in FIG. 3 begins in step 310.

In step 320, a source archive is accessed to perform self discovery of additional metadata. As discussed above, migration system 200 may discover additional metadata 235 that includes categories of metadata, other entity attributes that have been defined in addition to regular metadata, and metadata that has no placeholder in a target archive.

Accordingly, migration system 200 may determine how tables of target archive 210 are modified by adding the columns needed to store additional metadata 235. Migration system 200 may query tables or views of source archive 205 to get object names (database table names) being used for category classes in additional metadata 235. Once the list of category object names are retrieved, migration system 200 may determine which are actually being used by checking that the count in the tables is more than zero. Once the list of used category classes object names are obtained, each database table's meta data such as column names and their types can be retrieved. In one example, all the columns from used category classes object names will be combined into one table (docmeta) in target archive 210.

In step 330, one or more custom mappings are received. In various embodiments, migration system 200 may present to users one or more user interfaces allowing the users to view mappings for transferring metadata between source and target. Users may be able to match attributes, specify tables and records, and the like to provide a custom mapping. In one embodiment, a user uploads a file with the custom data mapping to be used in the massaging of the data during the actual migration. The format of the uploaded file may be hyperdata (HDA). The hda file can contain result sets that are used to map values.

In step 340, multithreading customizations are received. In various embodiments, migration system 200 may present to users one or more user interfaces allowing the users to specifying the number of worker threads, import/export rates, batch migration information, access information (e.g. whether to use SQL vs API access), and other configurable parameters that manage a migration.

In one example, the number of threads to use for reading from source archive 205 can be specified. The number of threads to use for inserting the information into target archive 210 can be specified. The information retrieved from source archive 205 per document may be stored in an object which is pushed into a synchronized stack of migration stack 215 that is shared with the threads that insert the information into target archive 210. The threads that insert the information into target archive 210 may grab one object at a time, and map the information into the format needed for insertion into target archive 210. The rate of insertion into the target archive may be improved by utilizing update batching.

In step 350, the migration is performed. Migration system 200 may initiate one or more threads that export metadata and/or content from source archive 205 into migration stack 215. Migration stack 215 may perform any number of procedures, transformations, or enrichments on the data in transit. Migration system 200 may also initiate one or more threads that import metadata and/or content temporally held or staged at migration stack 215 into target 210.

As discussed above, there may be a variety of ways that migration system 200 retrieves information from source archive 205. In general, migration system 200 generates files containing the document identification numbers for documents in source archive 205 that are to be migrated. For example, for a complete migration, a query may contain a where clause from 0 to the maximum id number, but for partial migration, the query may contain a where clause that either restricts the number of rows (from 0 to the nth id where n is the number of ids requested) or the range for the id to coincide with passed parameters. The document ids can be retrieved in ascending order. Multiple threads may be used to write out the id files. The names of the files can be pushed onto a synchronized stack of migration stack 215 to be processed by information retrieving threads. Each thread that retrieves document information will pop off a name of the document ids file to process at a time from the shared stack of file names. FIG. 3 ends in step 360.

Figure 4:
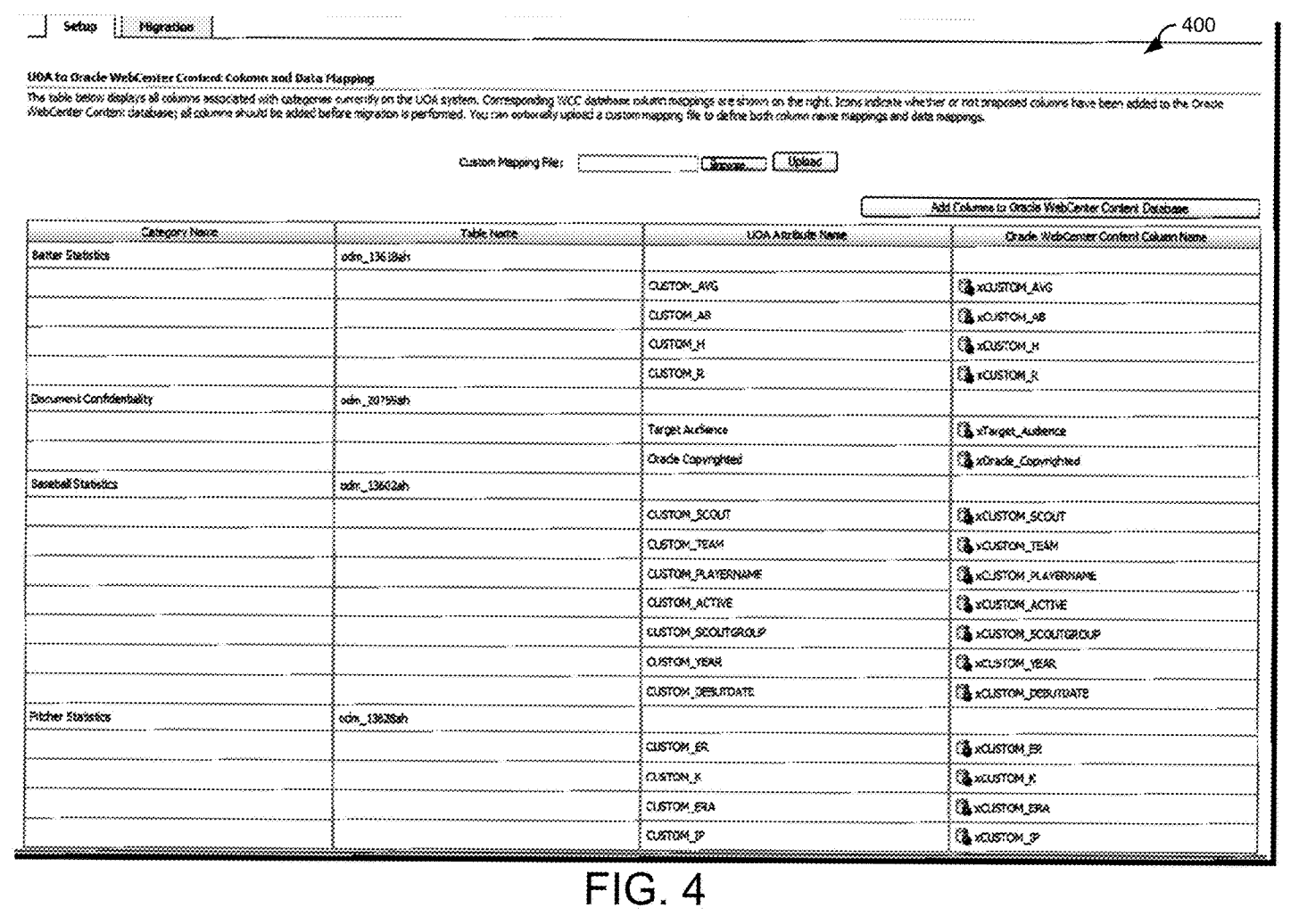

FIG. 4 is a screenshot of user interface 400 configured to allow users to customize metadata mappings for a metadata migration in one embodiment according to the present invention. In this example, a setup tab is used to view default mappings and add categories columns. A default name for a column name in target archive 210 may include an "x" added to an attribute name from source archive 205. A user may click "Add Columns to Oracle WebCenter Content Database" to add columns to the metadata for categories or additional metadata.

If default mappings are acceptable, there is no need to create and a upload custom mapping file. In one embodiment, the custom mapping file is a hda file. Three result sets can be included in the mapping file: mappings that map target meta column names to source column names for categories, mappings that map data values, and mappings that map target security configuration information to source security configuration information.

Figure 5:
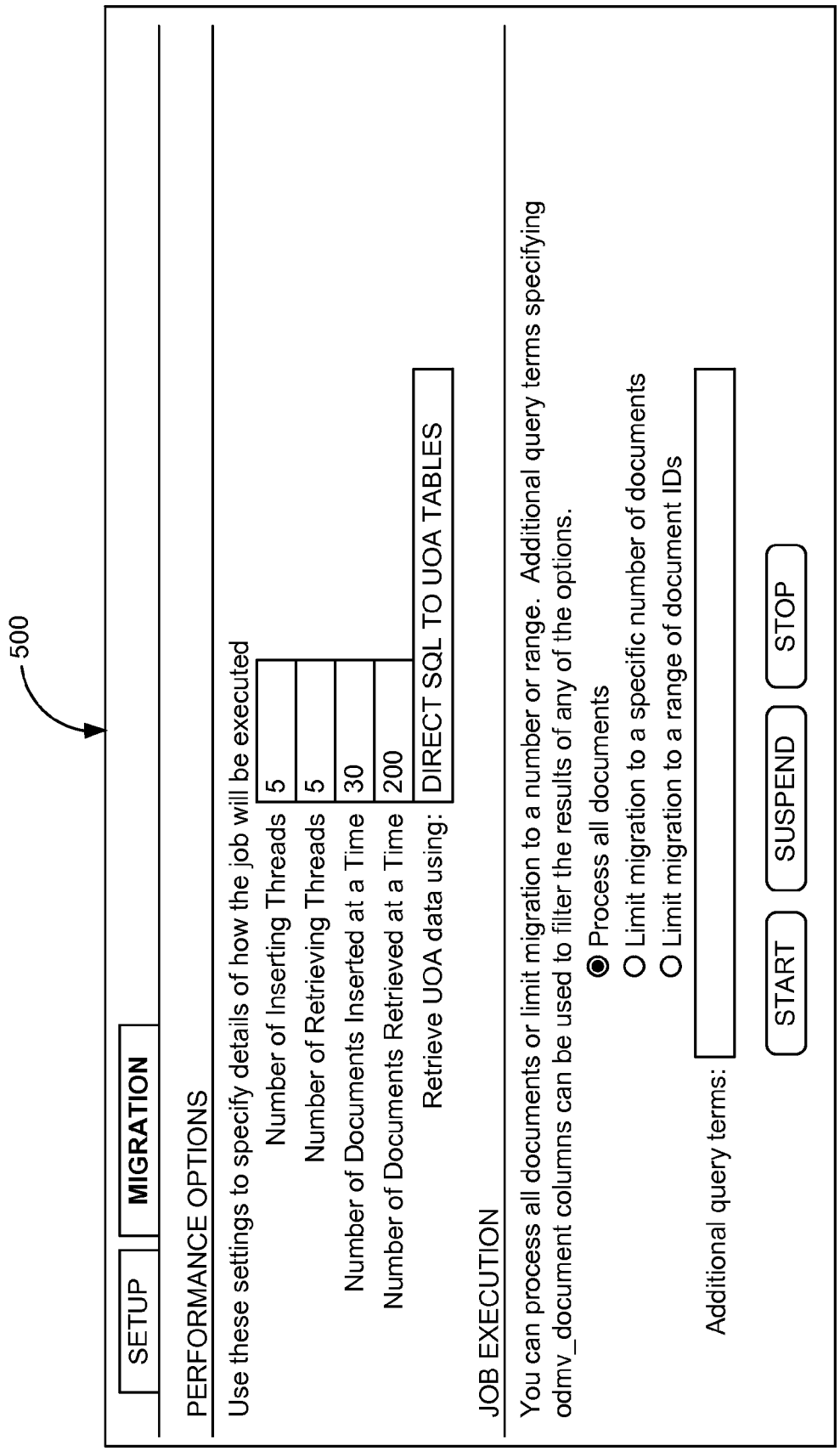
FIG. 5 is a screenshot of a user interface configured to allow users to customize multi-threading of a metadata migration in one embodiment according to the present invention.

FIG. 5 is a screenshot of user interface 500 configured to allow users to customize multi-threading of a metadata migration in one embodiment according to the present invention.

FIG. 6 is a screenshot of user interface 600 configured to allow users to view and interact with progress of a metadata migration in one embodiment according to the present invention. The job execution section allows the user to limit the information to migrate or to do a complete migration. To begin a migration, the user uses the Start button. The migration can be suspended or stopped at any time while it is in progress. If suspended, the migration can be resumed. If the content server crashes while a migration is in progress, the user will be allowed to resume or stop the previous migration when the server is up again. A migration can be suspended and the performance options can be changed then the migration resumed to improve performance.

Conclusion

Figure 7:
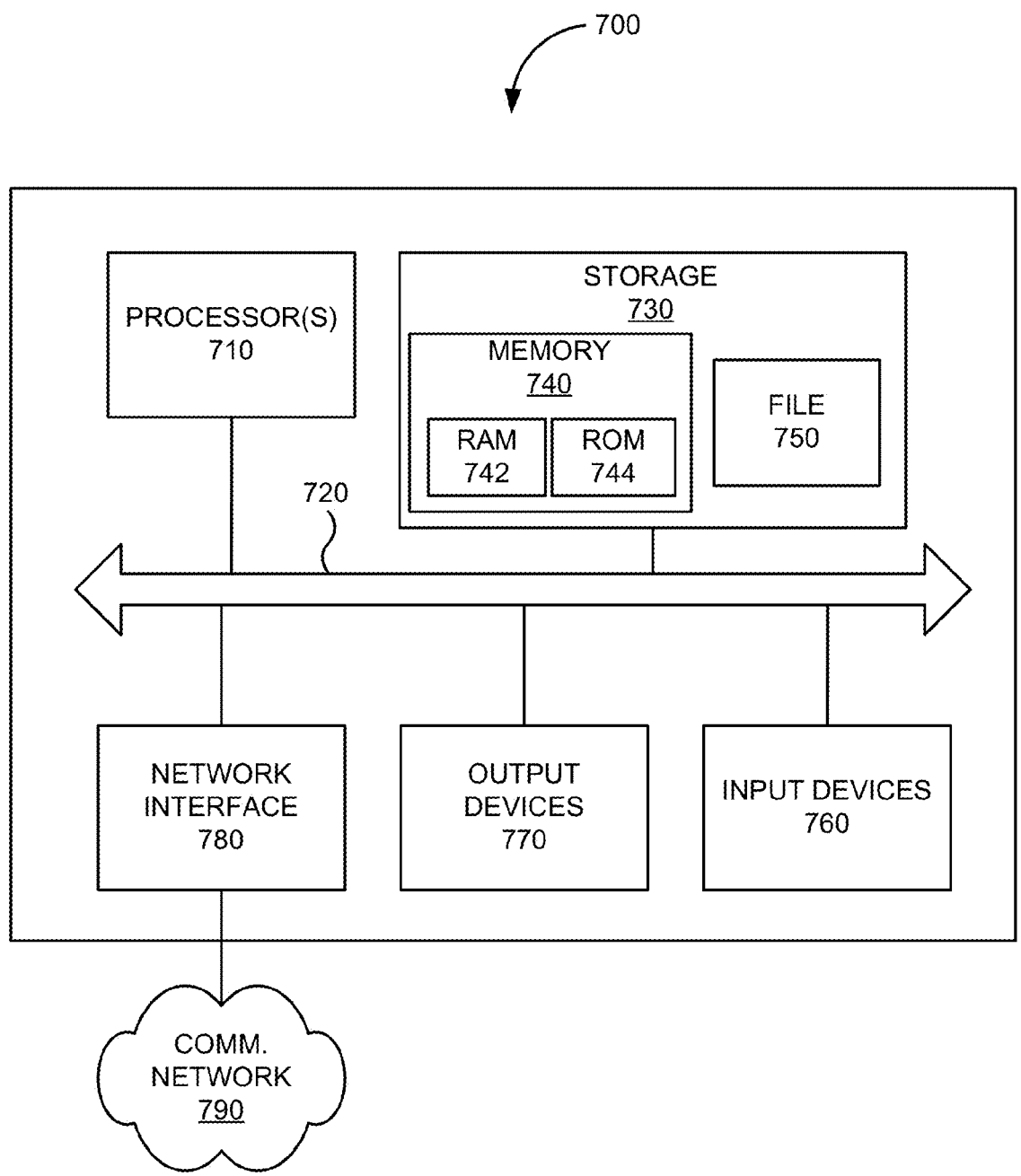
FIG. 7 is a block diagram of a computer system or information processing device that may incorporate an embodiment, be incorporated into an embodiment, or be used to practice any of the innovations, embodiments, and/or examples found within this disclosure.

FIG. 7 is a simplified block diagram of computer system 700 that may be used to practice embodiments of the present invention. As shown in FIG. 7, computer system 700 includes processor 710 that communicates with a number of peripheral devices via bus subsystem 720. These peripheral devices may include storage subsystem 730, comprising memory subsystem 740 and file storage subsystem 750, input devices 760, output devices 770, and network interface subsystem 780.

Bus subsystem 720 provides a mechanism for letting the various components and subsystems of computer system 700 communicate with each other as intended. Although bus subsystem 720 is shown schematically as a single bus, alternative embodiments of the bus subsystem may utilize multiple busses.

Storage subsystem 730 may be configured to store the basic programming and data constructs that provide the functionality of the present invention. Software (code modules or instructions) that provides the functionality of the present invention may be stored in storage subsystem 730. These software modules or instructions may be executed by processor(s) 710. Storage subsystem 730 may also provide a repository for storing data used in accordance with the present invention. Storage subsystem 730 may comprise memory subsystem 740 and file/disk storage subsystem 750.

Memory subsystem 740 may include a number of memories including a main random access memory (RAM) 742 for storage of instructions and data during program execution and a read only memory (ROM) 744 in which fixed instructions are stored. File storage subsystem 750 provides persistent (non-volatile) storage for program and data files, and may include a hard disk drive, a floppy disk drive along with associated removable media, a Compact Disk Read Only Memory (CD-ROM) drive, a DVD, an optical drive, removable media cartridges, and other like storage media.

Input devices 760 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and mechanisms for inputting information to computer system 700.

Output devices 770 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 700.

Network interface subsystem 780 provides an interface to other computer systems, devices, and networks, such as communications network 790. Network interface subsystem 780 serves as an interface for receiving data from and transmitting data to other systems from computer system 700. Some examples of communications network 790 are private networks, public networks, leased lines, the Internet, Ethernet networks, token ring networks, fiber optic networks, and the like.

Computer system 700 can be of various types including a personal computer, a portable computer, a workstation, a network computer, a mainframe, a kiosk, or any other data processing system. Due to the ever-changing nature of computers and networks, the description of computer system 700 depicted in FIG. 7 is intended only as a specific example for purposes of illustrating the preferred embodiment of the computer system. Many other configurations having more or fewer components than the system depicted in FIG. 7 are possible.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

Various embodiments of any of one or more inventions whose teachings may be presented within this disclosure can be implemented in the form of logic in software, firmware, hardware, or a combination thereof. The logic may be stored in or on a machine-accessible memory, a machine-readable article, a tangible computer-readable medium, a computer-readable storage medium, or other computer/machine-readable media as a set of instructions adapted to direct a central processing unit (CPU or processor) of a logic machine to perform a set of steps that may be disclosed in various embodiments of an invention presented within this disclosure. The logic may form part of a software program or computer program product as code modules become operational with a processor of a computer system or an information-processing device when executed to perform a method or process in various embodiments of an invention presented within this disclosure. Based on this disclosure and the teachings provided herein, a person of ordinary skill in the art will appreciate other ways, variations, modifications, alternatives, and/or methods for implementing in software, firmware, hardware, or combinations thereof any of the disclosed operations or functionalities of various embodiments of one or more of the presented inventions.

The disclosed examples, implementations, and various embodiments of any one of those inventions whose teachings may be presented within this disclosure are merely illustrative to convey with reasonable clarity to those skilled in the art the teachings of this disclosure. As these implementations and embodiments may be described with reference to exemplary illustrations or specific figures, various modifications or adaptations of the methods and/or specific structures described can become apparent to those skilled in the art. All such modifications, adaptations, or variations that rely upon this disclosure and these teachings found herein, and through which the teachings have advanced the art, are to be considered within the scope of the one or more inventions whose teachings may be presented within this disclosure. Hence, the present descriptions and drawings should not be considered in a limiting sense, as it is understood that an invention presented within a disclosure is in no way limited to those embodiments specifically illustrated.

Accordingly, the above description and any accompanying drawings, illustrations, and figures are intended to be illustrative but not restrictive. The scope of any invention presented within this disclosure should, therefore, be determined not with simple reference to the above description and those embodiments shown in the figures, but instead should be determined with reference to the pending claims along with their full scope or equivalents.

What is claimed is:

1. A method for migrating document content and metadata from a source archive to a target archive, the method comprising:
   accessing, at one or more computer systems, metadata of a source archive to determine a first set of metadata and a second set of metadata in the source archive, wherein the first set of metadata and the second set of metadata describe content stored in the source archive and wherein the first set of metadata comprises metadata having a known structure and the second set of metadata comprises metadata having a user-defined structure;
   generating, with one or more processors associated with the one or more computer systems, a user interface configured to allow users to map the second set of metadata in order to migrate the second set of metadata to metadata of the target archive in columns that are added to the target archive for storing the second set of metadata;
   modifying tables in the target archive in accordance with category classes of database table names of the second set of metadata;
   receiving, at the one or more computer systems, mapping information for the second set of metadata, wherein the mapping information identifies one or more import threads and export threads, wherein the mapping information is configured for the second set of metadata, and wherein the mapping information comprises hyperdata;
   migrating, with one or more processors associated with the one or more computer systems, the first set of metadata from the source archive and the second set of metadata from the source archive based on the mapping information in response to directly accessing tables storing the first and second set of metadata using a multithreading performed in a migration stack in accordance with the one or more import threads and export threads, wherein the content remains at that source archive; and
   configuring, with the one or more processors associated with the one or more computer systems, the target archive to respond to requests based on migrated metadata and an external storage component comprising a set of rules that redirects access to the content and defines whether the content is to be accessed via metadata that is stored in one of the source archive and the target archive.

2. The method of claim 1 wherein accessing the source archive to determine the first set of metadata and the second set of metadata comprises accessing the source archive using a direct query on tables of the source archive.

3. The method of claim 1 wherein accessing the source archive to determine the first set of metadata and the second set of metadata comprises accessing the source archive using an API of the source archive.

4. The method of claim 1 wherein generating the user interface configured to allow users to map the second set of metadata to migrate the second set of metadata to metadata of the target archive comprises generating a predefined mapping based on the second set of metadata.

5. The method of claim 1 wherein migrating the first set of metadata and the second set of metadata comprises utilizing the migration stack communicating between the source archive and the target archive.

6. A non-transitory computer-readable medium for migrating document content and metadata from a source archive to a target archive, the non-transitory computer-readable medium comprising:
   code for accessing metadata of a source archive to determine a first set of metadata and a second set of metadata in the source archive, wherein the first set of metadata and the second set of metadata describe content stored in the source archive and wherein the first set of metadata comprises metadata having a known structure and the second set of metadata comprises metadata having a user-defined structure;
   code for generating a user interface configured to allow users to map the second set of metadata in order to migrate the second set of metadata to metadata of the target archive in columns that are added to the target archive for storing the second set of metadata;
   code for modifying tables in the target archive in accordance with category classes of database table names of the second set of metadata;
   code for receiving mapping information for the second set of metadata, wherein the mapping information identifies one or more import threads and export threads and wherein the mapping information is configured for the second set of metadata, and wherein the mapping information comprises hyperdata;
   code for migrating the first set of metadata from the source archive and the second set of metadata from the source archive based on the mapping information in response to directly accessing tables storing the first and second set of metadata using a multithreading performed in a migration stack in accordance with the one or more import threads and export threads, wherein remains at that source archive;
   and code for configuring the target archive to respond to requests based on migrated metadata and an external storage component comprising a set of rules that redirects access to the content and defines whether the content is to be accessed via metadata that is stored in one of the source archive and the target archive.

7. The non-transitory computer-readable medium of claim 6 wherein the code for accessing the source archive to determine the first set of metadata and the second set of metadata comprises code for accessing the source archive using a direct query on tables of the source archive.

8. The non-transitory computer-readable medium of claim 6 wherein the code for accessing the source archive to determine the first set of metadata and the second set of metadata comprises code for accessing the source archive using an API of the source archive.

9. The non-transitory computer-readable medium of claim 6 wherein the code for generating the user interface configured to allow users to map the second set of metadata to migrate the second set of metadata to metadata of the target archive comprises code for generating a predefined mapping based on the second set of metadata.

10. The non-transitory computer-readable medium of claim 6 wherein the code for migrating the first set of metadata and the second set of metadata comprises code for utilizing the migration stack communicating between the source archive and the target archive.

11. A non-transitory system for migrating document content and metadata from a source archive to a target archive, the non-transitory system comprising:
 a processor; and
 a memory storing a set of instructions executable by the processor that configure the process to:
  access metadata of a source archive to determine a first set of metadata and a second set of metadata in the source archive, wherein the first set of metadata and the second set of metadata describe content stored in the source archive and wherein the first set of metadata comprises metadata having a known structure and the second set of metadata comprises metadata having a user-defined structure;
  generate a user interface configured to allow users to map the second set of metadata to migrate the second set of metadata to metadata of the target archive in columns that are added to the target archive for storing the second set of metadata;
  modify tables in the target archive in accordance with category classes of database table names of the second set of metadata;
  receive mapping information for the second set of metadata, wherein the mapping information identifies one or more import threads and export threads and wherein the mapping information is configured for the second set of metadata, and wherein the mapping information comprises hyperdata;
  migrate the first set of metadata from the source archive and the second set of metadata from the source archive based on the mapping information in response to directly accessing tables storing the first and second set of metadata using a multithreading performed in a migration stack in accordance with the one or more import threads and export threads, wherein the content remains at that source archive; and
  configure the target archive to respond to requests based on migrated metadata and an external storage component comprising a set of rules that redirects access to the content and defines whether the content is to be accessed via metadata that is stored in one of the source archive and the target archive.

12. The system of claim 11 wherein to access the source archive to determine the first set of metadata and the second set of metadata the processor is configured to access the source archive using a direct query on tables of the source archive.

13. The system of claim 11 wherein to access the source archive to determine the first set of metadata and the second set of metadata the processor is configured to access the source archive using an API of the source archive.

14. The system of claim 11 wherein to generate the user interface configured to allow users to map the second set of metadata to migrate the second set of metadata to metadata of the target archive the processor is configured to generate a predefined mapping based on the second set of metadata.

15. The system of claim 11, wherein the processor is configured to utilize the migration stack communicating between the source archive and the target archive in order to migrate the first set of metadata and the second set of metadata.

16. The method according to claim 1, wherein the second set of metadata comprises metadata that is custom or user-defined.

17. The method according to claim 1, wherein the first set of metadata comprises a first type of metadata describing content from the source archive and the second set of metadata comprises a second type of metadata describing content from the source archive.

18. The method according to claim 17, wherein the first type of metadata is different from the second type of metadata.

19. The method according to claim 1, wherein the one or more import threads and export threads are specified by a user.

* * * * *

UNITED STATES PATENT AND TRADEMARK OFFICE
CERTIFICATE OF CORRECTION

PATENT NO. : 10,162,826 B2  
APPLICATION NO. : 14/447867  
DATED : December 25, 2018  
INVENTOR(S) : Joglekar et al.

Page 1 of 1

It is certified that error appears in the above-identified patent and that said Letters Patent is hereby corrected as shown below:

In the Specification

In Column 4, Line 18, delete "ore" and insert -- or --, therefor.

In Column 4, Line 18, delete "and or/application" and insert -- and/or application --, therefor.

In Column 5, Line 41, delete "that that" and insert -- that --, therefor.

In Column 5, Line 43, delete "that that" and insert -- that --, therefor.

In the Claims

In Column 12, Line 63, in Claim 6, delete "remains" and insert -- the content remains --, therefor.

Signed and Sealed this  
Nineteenth Day of October, 2021

Drew Hirshfeld  
*Performing the Functions and Duties of the*  
*Under Secretary of Commerce for Intellectual Property and*  
*Director of the United States Patent and Trademark Office*